Patented Sept. 11, 1951

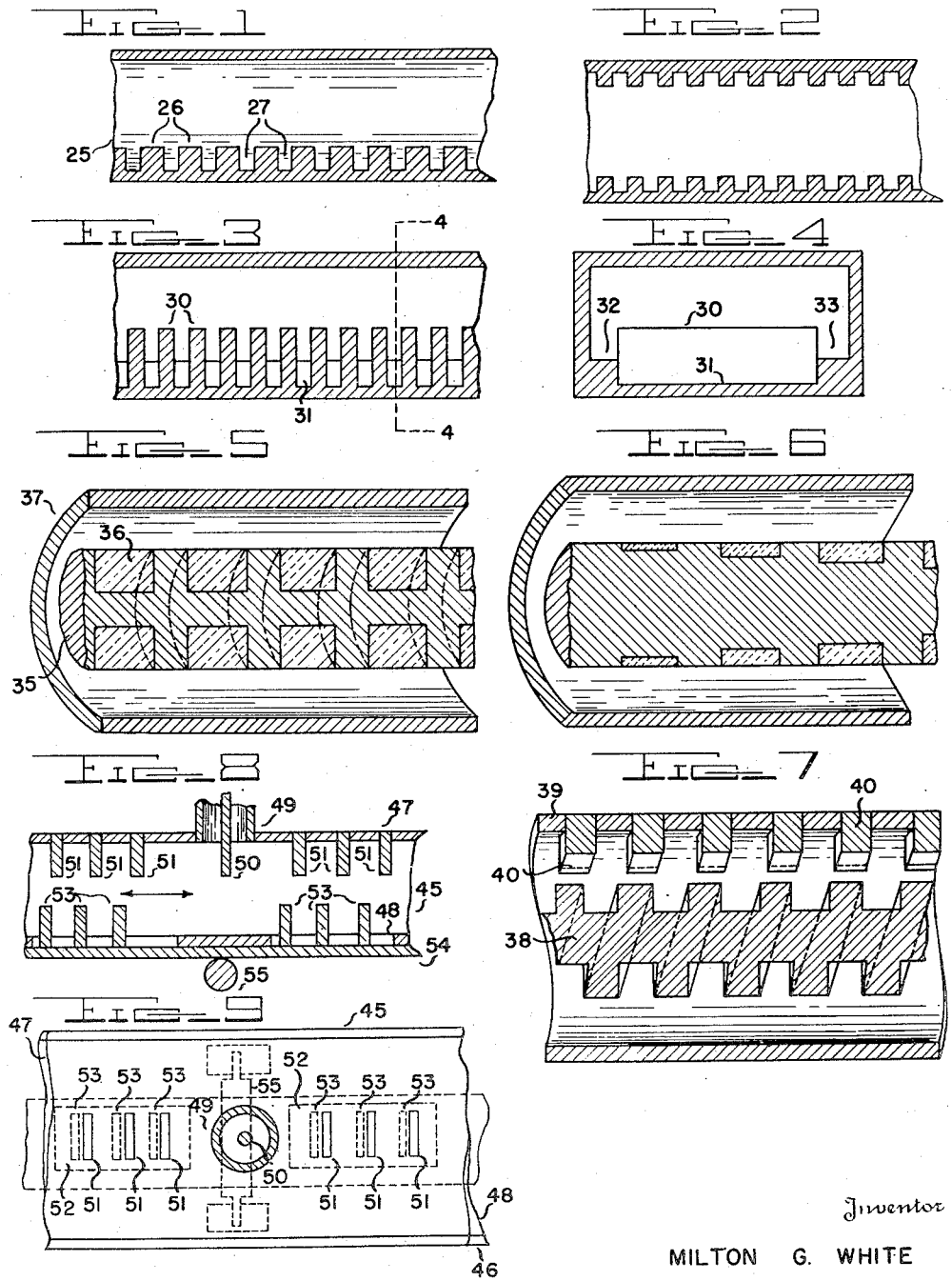

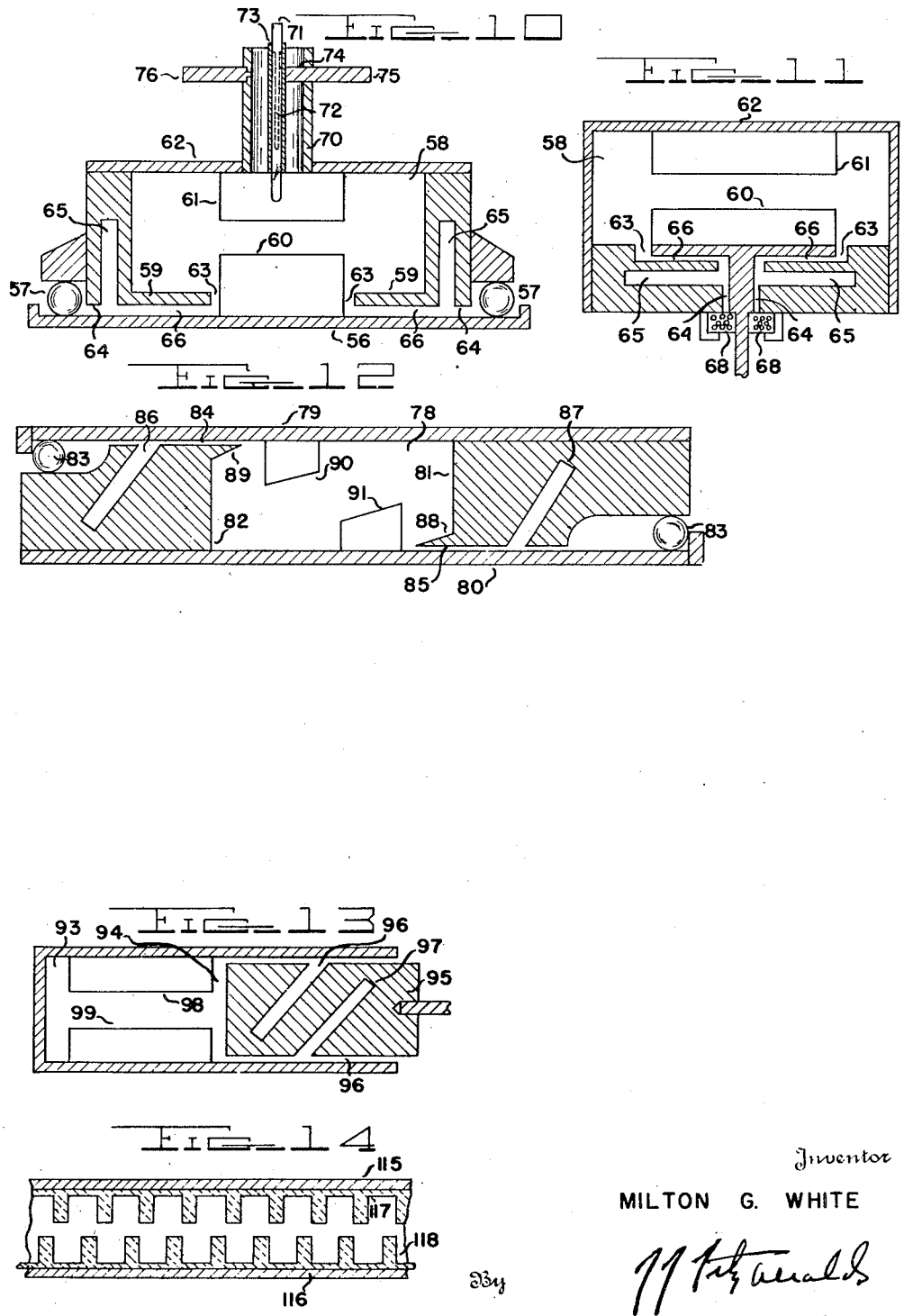

2,567,748

UNITED STATES PATENT OFFICE 2,567,748

CONTROL OF WAVE LENGTH IN WAVE GUIDES

Milton G. White, Cambridge, Mass., assignor, by mesne assignments, to the United States of America as represented by the Secretary of the Navy Application October 2, 1943, Serial No. 504,777

25 Claims. (Cl. 178—44)

This invention relates to the transmission of high-frequency electric oscillations and more particularly to the transmission of electric waves in wave guides and other such transmission apparatus. The invention is applicable both to coaxial-conductor wave guides and to hollow-pipe wave guides and concerns control of the wave length of traveling waves of a given frequency within such wave guides.

For many purposes it is desirable to modify the wave length of electric oscillations of a given frequency in a wave guide structure. Sometimes it is desired to shorten the wave length. Sometimes, in addition to shortening the wave lengths, it is even desired to provide arrangements for varying, periodically or otherwise, the wave length of the oscillations in the wave guide. Simple shortening of the wave length can be accomplished by substituting solid dielectric material for the otherwise more convenient air insulation, but this method of shortening the wave length has certain disadvantages. If the dielectric material extends completely across the wave guide or even across a large portion of the wave guide, the accumulation of moisture or dirt on the surfaces of the various pieces of dielectric material involves an electrical breakdown hazard which is particularly serious on account of the fact that if a breakdown should occur, the dielectric, if it is of organic material as in the case of the dielectrics with the most desirable electrical qualities, will be carbonized and precipitate a permanent failure or at least a source of losses, and in some cases the dielectric may actually catch fire. Also, when the wave guide is filled or almost filled with solid dielectric material it becomes very difficult to provide arrangements for varying the wave length in the wave guide for a given frequency over any substantial range of wave lengths.

It is an object of the present invention to provide for shortening the wave length in wave guide structures by the provision of suitable structures in said wave guides. It is a further object of this invention to provide such wave length shortening without the use of solid dielectric material in any location of high electric stress and, in the general case, without the necessity of any solid dielectric material at all. It is a further object of this invention to provide means for varying at will within a substantial range the wave length of electric oscillations in a wave guide without varying the frequency thereof. It is a further object of the invention to provide a certain advantageous type of antenna systems employing wave guides, in which the wave length of electric oscillations is controlled as aforesaid. Still a further object of the invention is to provide wave guides with shortened wave length characteristics with respect to waves transmitted therein which exhibit such characteristics in connection with the transmission of traveling waves under conditions of good energy transfer and low internal reflection and even in the substantial absence of standing waves.

In accordance with the present invention, certain repeated obstructions relatively closely spaced in terms of the wave length are introduced or constructed in a wave guide, which so affect the field, as further explained below, that the wave length is shortened. A number of forms of such arrangements are possible and it is also possible to provide means for mechanically moving certain of the obstructions which means are capable of producing a variation in the shortening of the wave length, which is to say a variation in the wave length for a given frequency. The invention will be more fully explained in connection with the accompanying drawing in which:

Figs. 1 and 2 are longitudinal cross sections of portions of wave guides in which the wave length for a given frequency has been modified in accordance with the present invention;

Figs. 3 and 4 are respectively a longitudinal cross section and a transverse cross section of another form of modified wave guide structure in accordance with the present invention;

Fig. 5 is a longitudinal cross section of still another form of wave guide modified in accordance with the present invention;

Fig. 6 is a longitudinal cross section illustrating the construction of a length of wave guide adapted to provide a transition between a conventional wave guide and a wave guide with a modified form of construction in accordance with the present invention;

Fig. 7 is a longitudinal cross section of a form of wave guide constructed in accordance with the present invention adapted for variation of the wave length of oscillations in the wave guide;

Figs. 8 and 9 show, in longitudinal cross section and in top view (partly in section) respectively, another form of wave guide constructed in accordance with the invention and adapted for variation of the wave length;

Figs. 10 and 11 are transverse cross sections of apparatus generally similar to the apparatus of Figs. 8 and 9;

Fig. 12 is a transverse cross section of a wave guide system in which a number of factors are availed of in a combined manner for the variation of the wave length in the wave guide;

Fig. 13 is a transverse cross section of another form of wave guide system having means for varying the wave length; and Fig. 14 is a longitudinal cross section of still another form of wave guide system for shortening and varying the wave length.

The more general principles of the invention will be understood from a consideration of Fig. 1. In Fig. 1 is shown a wave guide 25 which may have a rectangular transverse cross section. The bottom wall of the wave guide 25 is provided with a series of ridges 26 and grooves or valleys 27 arranged transversely of the longitudinal dimension of the wave guide. The ridges 26 may or may not extend completely across the wave guide, as is more fully pointed out below. The wave guide may be regarded as one provided with transverse ridges or as one provided with transverse grooves or pockets. For the purposes of the invention is is quite unimportant whether the recurrent modifications of the wave guide shape are in the form of projections extending into the wave guide or pockets extending out of the wave guide. These recurrent modifications of the wave guide cross section should, however, be in relatively large number per wave length—about ten or twelve per wave length in the guide is a convenient number although somewhat less could be used. It can be shown that when the modifications of the wave-guide cross section are evenly spaced, which is usually desirable, no frequency can be effectively transmitted with reasonable power transfer for which the wave length is shorter than twice the distance between corresponding portions of successive obstructions (or of successive pockets). For this reason, in order to avoid approach to this cut-off wave length, I provide more than two and usually at least three complete repetitions or cycles of wave-guide cross section change per wave length in the wave guide. This means, in the case of structures for varying the wave length in the guide, more than two such cycles per wave length for the shortest wave length used. In practice I prefer considerably more than two such cycles per wave length, for instance, about 6 or 7 cycles.

The depth of the grooves or pockets 27, and accordingly the height of the ridges or projections 26 is not particularly critical except that these dimensions are less than necessary for resonance at the frequency of transmission, which is to say less than a quarter-wave length. These dimensions are usually considerably less than a quarter-wave length, for reasons that will presently appear.

Although it is desirable for good results that the transverse ridges 26 should be abrupt—that is, should have abrupt rising and falling faces transverse to the wave length—it is not necessary that their profile be rectangular. The rectangular profile is, however, preferred.

When the wave guide 25 is excited with the electric vector of oscillations in the vertical direction with respect to the cross section shown in Fig. 1, there will be in addition to the vertically directed electric field between the top and bottom walls of the wave guide 25, a longitudinal electric field across the grooves or slots 27. There will also be certain circulating currents across the grooves. The presence and configuration of such electric fields can be estimated with good accuracy for practical purposes by an analysis of the system making use of Maxwell's equations, but this analysis of the situation is not necessary for the practical understanding and application of the invention. It is necessary only to point out that the analysis shows that the wave length in the guide 25 is shortened by the presence of the grooves and ridges and that this effect is confirmed by experiment. The amount of wave length change can be predicted mathematically. Thus for groove depth (or ridge height) substantially less than a quarter-wave length, the velocity of propagation, in the case in which the wave guide 25 is, instead of a rectangular wave guide, a parallel-plate wave guide having a smooth upper surface and a corrugated lower surface, is equal to $$v = \frac{c}{\sqrt{1+Ld/XY}}$$

in which, as shown on Fig. 1, L is the groove depth, $d$ is the groove width, X is the distance from the tops of the ridges to the upper plate of the wave guide, Y is the distance between centers of adjacent ridges or grooves and $c$ is the usual velocity of light in free space. Suitable adjustments of the calculations for the rectangular wave guide case and for the case where the ridges do not go completely across the wave guide (as for instance in the case of Fig. 4) can be made by known methods.

Where the grooves are much less than a quarter-wave length deep, the effect on the wave length is substantially independent of frequency so that the effect may be regarded as an increase in the effective dielectric constant of the dielectric in the wave guide (which is usually air). Regarded in this way, the effective dielectric constant $K_e$ may be expressed as $$\left(1+\frac{Ld}{XY}\right)$$

The magnitude of this effective dielectric constant is thus seen to be determined by the relative volume of the grooves or slots and of the remaining portion of the wave guide. This relation is found to hold to a reasonable degree of approximation for the rectangular wave guide, with the exception that the portion of the ridges and grooves which is near to the lateral walls of the wave guide does not add to the wave length shortening effect because of the configuration of the magnetic field and therefore the provision of an ungrooved channel at each lateral side of the wave guide, as shown in Fig. 4, produces a greater shortening of the wave length than if the grooves and ridges were continued to the edge of the wave guide. Where such channel is of substantial width as, for instance, in Fig. 4, the above-given formula for the effective dielectric constant provides a reasonable approximation of the wave length effect that may be expected.

As the depth of the grooves 27 approaches an electrical quarter-wave length (the actual length of which differs according to whether the grooves are open at the ends, towards the sides of the wave guide, or are closed by conducting surfaces) the velocity of propagation is no longer independent of frequency and the effective dielectric constant varies much as the actual dielectric constant of a material varies in the neighborhood of frequencies for which there exists "anomalous dispersion," increasing greatly as the frequency is raised (presumably on the other side of resonance, when the pockets or grooves are more than a quarter-wave length and less than a half-wave length deep, a wavelength lengthening effect will exist, which is again analogous to the phenomena associated with "anomalous dispersion" in optics). The shortening of the wave length proceeds until a wave length of twice the distance between corresponding parts of successive ridges is reached at which value of wave length very high energy reflections are set up. This value of wave length is reached before the frequency quite reaches the value for which the depth of the grooves is an electrical quarter-wave length. At such frequencies, moreover, the circulating currents in the grooves become large, causing losses which attenuate transmission along the wave guide, so that this type of behavior is to be avoided for the purposes of the present invention and the groove depth is therefore made substantially less than an electrical quarter-wave length.

Fig. 2 shows another type of wave guide in which the wave length is shortened in accordance with the above principles. In Fig. 2 the wave guide is again rectangular in transverse cross section but both the upper and lower walls of the wave guide are provided with transverse ridges and grooves in the same manner as the lower wall of the wave guide in Fig. 1. The walls provided with the ridges and grooves should be the broader walls of the wave guide, which is to say that in the normal mode of transmission the electric vector of the oscillations in the midportion of the wave guide will be vertically directed with respect to Fig. 2. A cylindrical wave guide may be designed to have a longitudinal cross section similar to Fig. 2. Thus in general it may be said that the grooves and ridges should be transverse to the flow of oscillatory currents in the portion of the wave guide wall occupied by the grooves, under conditions of wave transmission.

Figs. 3 and 4 show a form of construction preferred for rectangular wave guides where it is desired to shorten the wave length in the guide in accordance with the present invention. Fig. 4 is a transverse cross section along the line 4—4 of Fig. 3. In this arrangement the ridges 30 and the grooves 31 do not extend completely across the broader wall of the wave guide in which they are formed but terminate short of the lateral wave guide walls at both ends. Thus two channels 32 and 33 are provided at either side of the corrugated wall of the wave guide free of obstructions or pockets. As previously mentioned, the provision of the channels 32 and 33 instead of continuing the ridges and grooves to the lateral walls of the wave guide tends to increase the shortening of the wave length produced by the ridges and grooves, probably because of the lateral path provided for the magnetic flux linking the various grooves. But if the channels 32 and 33 are increased beyond a certain size, the shortening effect on the wave length then begins to decrease because of the decreased proportion of wave guide volume included within the transverse grooves. Because of the increased intensity of the electric field in the central portion of this type of wave guide, the omission of the end portions of the grooves and ridges has very little effect upon the electric field, but the configuration of the wave guide in this region is of particular importance in connection with the form of the magnetic field.

The effect of the ridges and grooves may be increased by filling the groves with solid dielectric material as illustrated in Fig. 5. The solid dielectric material increases the effective electrical depth of the groves in proportion with the square root of the dielectric constant of the material. The solid dielectric material, which may conveniently be polystyrene, is not not subjected to particularly high electric stresses because the grooves are normally non-resonant. The form of wave guide shown in Fig. 5 is the coaxial-conductor type, the ridges and grooves in this case being formed on the central conductor 35. The grooves are then annular in shape, being filled with dielectric material shown at 36. If desired, grooves or ridges of a similar sort might be provided upon the outer conductor 37, but in general it is more convenient to provide these features upon the inner conductor alone. The solid dielectric material shown in 36 has the advantage of serving not only to increase the effective depth of the grooves but also to maintain the rigidity of the inner conductor, permitting a good deal of such inner conductor to be cut away without loss of rigidity. Solid dielectric may similarly be used in rectangular wave guide structure to increase the effective depth of transverse grooves.

The "characteristic impedance" of a wave guide modified in accordance with the present invention by the introduction of ridges and grooves corresponds approximately to the characteristic impedance of a smooth wave guide of approximately the same average cross section as the corrugated wave guide. Consequently when a portion of smooth wave guide is to be coupled for maximum energy transfer to a portion of corrugated wave guide, there should be little or no change in the average cross section, or else some known form of impedance-matching device should be employed. Fig. 6 shows an impedance-matching device of the "taper section" class. It is designed to provide a transition between a coaxial-conductor wave guide or transmission line of the smooth (unmodified) type with a cross section such as that shown at the left on Fig. 6 to a modified wave guide such as that shown in Fig. 5. The transition is accomplished by providing annular notches or grooves such that each succeeding notch or groove is a little deeper than the preceding one, until the groove depth reaches the desired amount for the transmission line of the type shown in Fig. 5 to which it is desired to transfer energy. For good results the transition should be spread out over one or more wave lengths, the more gradual kinds of transition producing less reflections and having less frequency-sensitivity. The arrangement in Fig. 6, in which the transition from a normal wave guide to one modified for the shortening of the wave length in the guide is accomplished by providing dielectric-filled notches successively of increasing depth without change of the outer diameter of the inner conductor structure, has the advantage of permitting one to obtain full advantage of the space within the outer conductor up to the limits imposed by considerations regarding breakdown voltages between the inner and outer conductors.

In Fig. 7 there is shown a coaxial-conductor wave guide in which the inner conductor is provided with ridges and grooves, the ridges and grooves in this case being in the form of a continuous screw thread instead of in the form of annular rings and channels. The outer conductor of the wave guide shown in Fig. 7 is provided with spaced projections 40. These projections may be in a longitudinal row or in several staggered longitudinal rows, the projections being spaced by the spacing between turns of the screw thread on the inner conductor 38. If desired the projections of the outer conductor 39 might also be provided in the coalesced form of a continuous screw thread, but because of the difficulty of preparing such a structure it is preferred to provide a row of obstructions, which might be regarded as a discontinuous screw thread, and which may be conveniently mortised into the outer conductor 39. Means may then be provided, (not shown) for rotating the inner conductor 38 on its axis, with the result that the configuration of the electric field of the transmitted oscillations may be made to vary according to the rotational position of the inner conductor 38. It is found that such variation results in variation of the wave length of oscillations of a given frequency transmitted in the wave guide. The wave length is shortest when the screw thread ridges on the inner conductor 38 are substantially in registry with the projections 40 and becomes less short as the said ridges and the said projections are displaced with respect to each other. The wave length change which accompanies the relative shift of the ridges of the inner conductor past the projections on the outer conductor in the apparatus of Fig. 7 may be explained by considering that as the ridges and projections move into registry, the electric field between them is intensified because of the increased localized capacitance, which intensification of charge is probably accompanied by increased activity of the field in the grooves between the various ridges and projections, thus intensifying the wave-length shortening effect of these said grooves.

Figs. 8 and 9 show, in longitudinal cross section and in plan respectively, an apparatus for providing a variable shortening of the wave length in a rectangular pipe wave guide employing the principles just explained in connection with Fig. 7. The narrower walls of the wave guide, which are parallel to the electric vector when the wave guide is excited in the usual mode, are shown at 45 and 46. The upper and lower walls of the wave guide are shown at 47 and 48 respectively. Certain branch wave guides of the coaxial-conductor type, one of which is shown with an outer conductor 49 and an inner conductor 50, are mounted at intervals on the wave guide wall 47 and these branch wave guides may lead to the elements of an antenna system. These branch wave guides are electrostatically coupled to the main wave guide, as by the projection of the inner conductor 50 into the inside of the main wave guide. The upper wall 47 of the main wave guide carries regularly spaced projections 51, one or more of which and preferably several, are located between successive branch wave guides. The projections 51 are preferably flat vanes oriented transversely of the wave guide and extending therein in the central portion of the wave guide, being mounted near the middle of the wave guide wall 47. Others forms of projections may be used, thus, for instance, if adjustability were desired, simple machine screws suitably mounted on the wave guide wall 47 might be provided instead of the vanes shown in Fig. 8.

The bottom wall 48 of the wave guide is provided with elongated apertures 52 (or a single longitudinal slit) through which another series of projections 53 similar to the projections 51 are allowed to extend into the wave guide. The projections 53 are mounted upon a metal strip 54 which is adapted to move them longitudinally together and which is held in contact with the wave guide wall 48 by means of suitable spring-pressed rollers such as the roller 55. It will thus be seen that as the strip 54 is moved longitudinally with respect to the wave guide wall 48 to bring the projections 53 into alignment with the projections 51, the wave length in the wave guide will be progressively shortened, reaching a maximum effect when alignment is obtained. By manipulation of the strip 34, therefore, the wave length may be adjusted to some desired value or changed, periodically or otherwise, in some desired manner.

Figs. 10 and 11 are cross sections of wave guide transmission systems similar to that shown in Figs. 8 and 9 and incorporating provisions for reducing contact losses, a matter which becomes important if the projections 53 occupy a large fraction of the wave guide width. In Fig. 10 the strip 54 is replaced by the long metallic plate 56 mounted on ball bearings 57 to facilitate longitudinal displacement with respect to the wave guide 58. The wave guide has a continuous central longitudinal opening in its lower wall 59 through which protrude the projections 60 mounted upon the plate 56. Another series of projections 61 corresponding to the projections 51 of Fig. 8 and Fig. 9 are mounted upon the top wall 62 of the wave guide 58. The wave guide structure is so constituted that at each side of the central opening in the lower wave guide wall there is a clearance space 66 having an electrical dimension of approximately a quarter-wave length between the opening 63 at the edge of the central hole of the wall 59 and the opening or sliding contact 64. At the opening or contact 64 (it is immaterial whether an opening or a contact is provided here, in accordance with the principles explained in the patent application of W. W. Salisbury Serial No. 489,844, filed June 5, 1943, for Radio Frequency Joints) there is provided a branch channel 65 having a depth of an electrical quarter-wave length. On account of the branch channel 65, the clearance space 66 appears to be terminated by a high impedance, so that at the entrance 63 of the clearance space 66 a low impedance is presented because of the quarter-wave length dimension of the clearance space 66. It will be noted that the branch channel 65 is wider than the clearance space 66, so that the impedance appearing at the entrance to the clearance space 66 from the wave guide end will be low not only at the resonant frequency for which the electrical quarter-wave length dimension holds exactly but also over a range of frequencies in this neighborhood. Variation of the wave length in the wave guide 58 is obtained substantially as in the case of the apparatus of Figs. 8 and 9 by longitudinal movement of the plate 56.

A substantially equivalent arrangement is shown in Fig. 11, the quarter-wave length clearances and channels being provided in this case directly under the support of the projections 60 instead of under the outer parts of the lower wave guide wall. Instead of the ball bearings 57 strips or pieces of bearing material shown generally at 68 are provided.

In Fig. 10 a branch wave guide supporting a dipole antenna is shown mounted upon the upper wall 62 in the wave guide 58. This may be one of a number of such units associated with the wave guide 58 for the provision of an antenna system of variable directivity, in accordance with the principles described in the patent application of L. W. Alvarez, Serial No. 509,790. The branch wave guide includes an outer metallic tube 70 and an inner metallic rod 71. The tube 70 is split along a diameter, in this case such diameter being parallel to the axis of the wave guide 58. The split is shown by the dotted line appearing at 72. The split in the tube 70 is electrically a quarter-wave length long so that when the tube is suitably excited an alternating voltage at the resonant frequency may appear between the two branches of the tubular member, which alternating voltage will be at a maximum at the end of the tubular member 70. The excitation is provided by the central rod 71 which is slidably mounted in a close-fitting metallic tube 73 in order that by vertical adjustment of the rod 71 the excitation may be varied. The metallic tube 73 is connected with one of the segments of the upper portion of the tubular member 70 the connection being made through the rod 74 which extends beyond the tubular member 70 to form one arm 75 of the dipole antenna. The other arm of the dipole antenna is shown at 76 and is mounted upon the other segment of the tubular member 70. The dipole antenna 75, 76 is preferably mounted about a quarter-wave length above the upper surface of the wave guide wall 62 in order that the latter may effectively act as a reflector adapted to reinforce the upward radiation from the dipole. As shown in Fig. 10 the dipole 75, 76 is adapted for upward radiation, but it is to be understood that an antenna system of this type may be mounted in any desired position.

Fig. 12 shows, in transverse cross section, an arrangement for varying the wave length in a wave guide which makes use both of the phenomena above described and also of the effect on the wave length of varying the broader dimension of the wave guide. The wave guide appears at 78 and is formed by the upper and lower plates 79 and 80 and the lateral blocks 81 and 82 mounted respectively upon the plates 79 and 80. Ball bearings 83 permit relative lateral shifting of the plates 79 and 80. Clearances 84 and 85 and branch channels 86 and 87 are provided functioning essentially as the clearances 66 and the branch channels 65 in Figs. 10 and 11. In order that the mouth of the clearances 84 and 85 should open into the wave guide at a location of not too high current, the surfaces of the blocks 81 and 82 defining the lateral walls of the wave guide are provided with small projections 88 and 89. In spite of these slight modifications the wave guide may be regarded as a substantially rectangular wave guide. It will be seen that the wave length in the wave guide 78 may be controlled by relative lateral shifting of the plates 79 and 80 by virtue of the change in the width of the wave guide 78, the wave length being greater when the wave guide 78 is narrower (and approaches closer to cut-off) and being shorter when the wave guide is wider.

As pointed out more fully in the patent application of L. W. Alvarez, Serial No. 509,790, there are certain limitations upon the range of wave length change that can be accomplished by simply varying the width of the wave guide, imposed by the fact that cut-off occurs when the width is one-half of the free space wave length or less and that interfering modes appear when the width is equal to the free space wave length or more. It will further be observed by reference to the said application of L. W. Alvarez that when a wave guide of variable width is used for the purpose of varying the directivity of an antenna array fed by the said wave guide, the variation of the directivity is much greater for a given change in the width of the wave guide when this width is at the narrow end of the cycle and at the wide end of the cycle. Consequently in Fig. 12 two series of projections, the projections 90 mounted upon the wave guide 79 and the projections 91 mounted upon the wave guide 80 are provided for producing further shortening of the wave lengths in the wave guide after the wave guide reaches a certain width. Thus it will be seen that when the structure is in the position shown in Fig. 12 the projections 90 and 91 will have relatively little effect, both because they are away from the center of the wave guide and because they are relatively distant from each other. As the wave guide is narrowed, the projections 90 and 91 come closer together and also approach the center of the wave guide 78, thereby increasing their effect. When the series of projections begin to overlap vertically, their effect is greatly increased, thus making up for the fact that by the time the wave guide has reached this width the effect of the wave guide width on the wave length and upon antenna directivity has become less pronounced. In the particular case illustrated, the upper surfaces of the projections 90 and 91 are constructed with a slight slant so that lateral shifting of the plates 79 and 80 will serve not only to increase the overlap between these projections but also to bring these projections actually closer together.

Fig. 13 shows, also in transverse cross section, still another arrangement making use of the present invention for providing a wave guide in which the wave length may be varied without varying the frequency. Three walls of the wave guide 93 enclose the channel 94 which extends to the right to receive the plug member 95 which forms the fourth wall of the guide. Clearances 96 and branch channels 97 are provided functioning as the clearances 66 and branch channels 65 in Figs. 10 and 11. Opposed series of spaced projections 98 and 99 are provided in the wave guide mounted on the broad sides of the channel 94. When the plug 95 is advanced to the left until it is very close to the edges of the projections 98 and 99, the magnetic field associated with these projections is disturbed and the effective electrical depth of these grooves between the projections of each series is decreased, with the result that the wave length shortening effect of the projections is decreased, which is to say that the wave length of oscillations of a given frequency in the wave guide 93 is increased. Movement of the plug 95 to the right of such a position will increase the wave length shortening effect of the projections 98 and 99, thereby shortening the wave length in the wave guide 93. The effect of the motion of the plug 95 upon the wave length shortening effect of the series of projections 98 and 99 occurs in addition to the effect on the wave length in the wave guide caused by the variation in the width of the wave guide as the plug 95 is moved. In this case, however, unlike in the case of Fig. 12, the rate of change of both effects is greatest for the extreme left position of the plug 95.

Still other ways of varying the wave length in a wave guide modified or constructed in accordance with the present invention may be devised. For instance, a rectangular wave guide provided with transverse projections as shown in Figs. 1-4 might be squeezed so as to bring the sides carrying the projections closer together, which would result in reducing the total volume of the wave guide without reducing the volume of the spaces between the projections, so that the squeezing would result in a further shortening of the wave length. Other arrangements operating in a similar manner are also possible.

Another manner of applying the principles of the present invention to obtain a variable shortening of the wave length in a wave guide is shown in Fig. 14. This method is not considered as effective as those described above. A rectangular wave guide is shown here in longitudinal cross section parallel to the electric vector of the oscillation to be transmitted, the top and bottom meallic walls appearing at 115 and 116. On these walls, on the inner surface, are mounted mutually similar strips of solid dielectric material, such as polystyrene, shown at 117 and 118 respectively. The strips 117 and 118 may extend for the full width of the wave guide or may extend only across the central portion of the broader walls. They are provided with approximately rectangular transverse ridges and valleys. In order to provide variability of the wave length, the strip 118 may be made longitudinally movable with respect to the metallic wave guide walls, while the strip 117 is fixed on the metallic walls 115. The strip the position of which is fixed need not be a continuous strip but may, if desired, conveniently be interrupted for the provision of junctions with branch wave guides or the like.

The operation of the device shown in Fig. 14 is essentially the same as that of other devices heretofore explained. One way of analyzing its performance is to bring in the concept that a rod of solid dielectric can itself be treated as a wave guide even when surrounded by air and without being provided with a metallic coating, and further that a rod of dielectric in a metal pipe wave guide may be regarded as a wave guide within a wave guide. Another way of analyzing the behavior of the apparatus shown in Fig. 14 is to consider that the dielectric constant of the dielectric medium in a wave guide is a factor governing the characteristic impedance of the wave guide so that the introduction of abrupt changes of the amount of a solid dielectric in an otherwise air-filled wave guide has an effect of producing a sudden change in the characteristic impedance, just as does a change in transverse dimensions.

Various other ways of applying the principles of the present invention for shortening the wave length of oscillations of a given frequency in wave guides of various types and/or for providing adjustability or variability of the wave length in such wave guides for a given frequency of operation are possible within the spirit of the present invention, the scope of which is indicated by the appended claims.

References to wave length made herein are intended to refer to desired frequencies of operation, at which it is intended that radio-frequency power should be transferred through the wave guide or guides in question. Unless otherwise specified, wave length dimensions refer to the wave length in the particular structure or environment under consideration.

What is claimed is:
1. A metallic wave guide for high-frequency electric waves adapted for varying the wave length independently of the frequency and having two substantially opposed series of projections, each series including more than two projections per wave length in said guide as measured within the guide, said projections extending in a direction substantially the same as that of the electric field which would be obtained in the absence of said projections, said wave guide being so construc.ed that one of said series of projections may be shifted longitudinally with respect to the other of said series of projections in the direction of propagation of energy of said wave guide, said shifting causing a change in the wave length of the electric waves in said wave guide.

2. A wave guide according to claim 1 in which said means for shifting one series of projec.ions is adapted to produce a longitudinal shift of said series, and in which said series is mounted on a metallic strip forming part of said means.

3. A wave guide according to claim 1 in which the grooves of at least one of said series of ridges and grooves are at least partially filled with solid dielectric material.

4. A metallic wave guide s.ructure for high-frequency electric waves adapted for varying the wave length independently of the frequency and having a series of abrupt changes of transverse wave guide electrical dimensions on one surface of said wave guide adapted to carry longitudinal current when said wave guide is excited and another series of abrupt changes of transverse wave guide electrical dimension on another surface of said wave guide opposed to said first-mentioned surface and likewise adapted to carry longitudinal current when said wave guide is excited, each of said series of abrupt changes including more than four alternating changes per wave length as measured within the guide, said wave guide structure being constructed such that one of said surfaces may be shifted longitudinally rela.ive to the other of said surfaces thereby changing the configuration of the electromagnetic field in said wave guide when said wave guide is excited and to change the magnitude of the wave length in said wave guide.

5. A wave guide for high-frequency electric waves having two broad and two narrow metallic walls and generally having an approximately rectangular cross section except for certain fea.ures of said broad walls mentioned in this claim, at least a portion of one of said broad walls having a series of rectangular projections extending into said wave guide of a dimension in the direction of energy propagation in said wave guide which is small compared to the wave length as measured within said guide, at least a portion of the other of said broad walls being shiftable in the direction of energy propagation with respect to said first-mentioned portion of said first-mentioned broad wall and having likewise a series of projections extending into said wave guide of a dimension in the direction of energy propagation in said wave guide which is small compared to the wave length as measured within the guide.

6. A wave guide for high-frequency electric waves having two broad and two narrow metallic walls and generally having an approximately rectangular cross section except for certain features of said broad walls mentioned in this claim, at least a portion of each of said broad walls having a succession of transverse ridges and grooves, said ridges and said grooves being of a dimension in the direction of energy propagation in said wave guide which is small compared to the wave length, said portion of one of said broad walls being shiftable with respect to the other of said broad walls in a direction along the longitudinal axis of said wave guide.

7. A wave guide in accordance with claim 6 in which the said grooves are at least partially filled with solid dielectric material.

8. A rectangular metal-walled wave guide for transmitting high-frequency electric wave energy at a controllable phase velocity, said wave guide having a plurality of mutually directed projections extending into said wave guide from the broad walls thereof in the general direction of the electric vector of the energy to be transmitted therethrough, said projections being spaced so that there are at least three per wave length in said wave guide, said wave guide being constructed to provide for longitudinal movement of a portion of said wave guide structure bearing at least some of said projections relative to other portions of said wave guide structure, said movement producing variation of the wave-length-shortening effect of said projections.

9. Microwave apparatus comprising, a rectangular conducting wave guide having a first major axis extending longitudinally of said guide and a second major axis extending transversely of said guide along the wider dimension thereof, a plurality of transverse projections extending into said guide from the broad walls thereof, said projections being uniformly spaced along said first major axis, and means for moving one wall of said wave guide relative to a corresponding opposite wall in a direction parallel to one of said major axes, said movement producing variation of the velocity of phase propagation of energy within said guide.

10. Microwave apparatus comprising, a hollow rectangular wave guide having a first major axis extending longitudinally of said guide and a second major axis extending transversely of said guide along the wider dimension thereof, a plurality of mutually directed projections extending into said wave guide from the broad walls thereof, said projections being longitudinally spaced along said guide so that there are at least three per wave length in said guide, said wave guide being constructed to provide movement of one wall thereof relative the corresponding opposite wall in a direction parallel to one of said major axes, said movement producing variation of the velocity of phase propagation of energy within said guide.

11. Electromagnetic wave energy transmission apparatus comprising, a rectangular metallic wave guide having a first major axis extending longitudinally of said guide and a second major axis extending transversely of said guide between the narrow walls thereof, a plurality of longitudinally spaced metallic projections extending into the interior of said guide, said projections being of substantially rectangular cross-section and having a dimension along said second major axis substantially less than the distance between said narrow walls, thereby providing unobstructed channels between said narrow walls and said projections, and means for moving one wall of said wave guide relative to a corresponding opposite wall in a direction parallel to one of said major axes.

12. A substantially rectangular metallic wave guide for the transmission of high frequency electrical waves having two broad walls and two narrow walls, said wave guide having mutually directed longitudinally spaced metallic projections extending into the interior of said guide from said broad walls, said projections being of substantially rectangular cross-section and having a dimension transverse to the direction of energy propagation in said wave guide substantially less than the corresponding dimension of said broad wall, thereby providing a pair of unobstructed channels between said narrow walls and said projections, whereby the wave length of energy flowing within said wave guide is less than the wave length of said energy in free space.

13. Apparatus in accordance with claim 12 and means for moving one wall of said wave guide relative to a corresponding opposite wall for varying the amount by which the wave length of energy flowing within said guide is less than the free space wave length of said energy.

14. Apparatus in accordance with claim 12 and means for moving one narrow wall of said guide transversely of said guide thereby to vary the transverse dimension of said broad walls and the width of one of said channels to vary the amount by which the wave length of energy flowing within said guide is less than the free space wave length of said energy.

15. Apparatus in accordance with claim 12 and means for moving one of said broad walls longitudinally of said guide relative to other portions of said wave guide, said movement producing variation of the wave-length-shortening effect of said projections.

16. A substantially rectangular metallic wave guide for the transmission of high frequency electrical waves having two broad walls and two narrow walls, said wave guide having a multiplicity of transverse projections extending into the interior of said wave guide from each of said broad walls, said projections being substantially rectangular in cross-section having a dimension in the direction of energy propagation in said guide small compared to the wave length of said electrical waves and a dimension transverse to the direction of energy propagation substantially less than the corresponding dimension of said broad walls, thereby providing a pair of unobstructed channels between said narrow walls and said projections, said projections being uniformly spaced longitudinally of said guide such that there are more than two per electrical wave length, the transverse dimension of said projections from said broad walls being substantially a quarter wave length of said waves.

17. A rectangular metallic wave guide for transmitting electric wave energy at a controllable phase velocity, said wave guide having a plurality of spaced mutually directed projections extending into said guide from the broad walls thereof and being constructed to provide for longitudinal movement of one of the broad walls relative to other portions of said wave guide.

18. A rectangular metallic wave guide for transmitting electric wave energy at a controllable phase velocity, said wave guide having a plurality of transverse mutually directed metallic projections extending into said guide from the broad walls thereof and being spaced longitudinally of said guide, said guide being constructed to provide relative longitudinal movement between said broad walls.

19. A rectangular metallic wave guide for transmitting electric wave energy at a controllable phase velocity, said wave guide having longitudinally spaced conducting projections extending into the interior of the guide from the broad walls thereof, and means for moving one broad wall relative to the other longitudinally of said guide.

20. Apparatus in accordance with claim 10 wherein one narrow wall is constructed for movement relative to the other narrow wall, said one narrow wall comprising a conducting plunger slidably fitted between the broad walls of said wave guide.

21. Apparatus in accordance with claim 10 wherein one narrow wall is constructed for movement relative to the other narrow wall, said one narrow wall comprising a conducting plunger slidably fitted with clearances between the broad walls of said wave guide, said plunger having grooves therein cooperative with said clearances between said plunger and said broad walls to provide low radio frequency impedance between said plunger and the broad walls of said wave guide.

22. Apparatus in accordance with claim 10 wherein one broad wall is arranged for movement longitudinally of said guide relative to the opposite broad wall, said one broad wall including an elongated metallic plate on which said projections are mounted, and bearing means arranged to provide clearance between said plate and the rest of said guide and to facilitate movement of said plate relative to the rest of the guide, the narrow walls of said wave guide having longitudinal grooves therein arranged to cooperate with said clearance to provide low radio frequency impedance between said plate and the rest of said wave guide.

23. Apparatus in accordance with claim 10 wherein one broad wall is arranged for movement longitudinally of said guide relative to the opposite broad wall, said one broad wall including an elongated metallic plate on which said projections are mounted, and bearing means supporting said plate to provide a clearance space between said plate and other conductive portions of said guide, the stationary portions of said wave guide having longitudinal grooves therein arranged to cooperate with said clearance space to provide low radio frequency impedance between said movable plate and the stationary portion of said wave guide.

24. Apparatus in accordance with claim 10 wherein said wave guide is formed of two plate and block structures, the plate of each of said structures defining a broad wall and the block of each of said structures defining a narrow wall of said guide, and bearing means disposed between the block of each of said structures and the plate of the other structure providing clearance gaps between said structures, each of said blocks having a longitudinal groove therein arranged to cooperate with one of said clearance gaps to produce a relatively low radio frequency impedance at the wave guide corners, said bearing means being arranged whereby said structures are adapted for movement parallel to said second major axis.

25. Apparatus in accordance with claim 10 wherein said wave guide is formed of two plate and block structures, the plate of each of said structures defining one broad wall of said guide and the block of each of said structures defining a narrow wall of said guide, the plate and block of each of said structures being integrally joined together, bearings disposed between the block of each structure and the plate of the other structure providing a clearance gap between the block of each structure and the plate of the other structure, each of said blocks having longitudinal grooves therein communicating with a corresponding gap and cooperating therewith to provide a relatively low radio frequency impedance at the wave guide corners, said bearings being arranged whereby said structures are adapted for movement parallel to said second major axis relative to each other thereby to vary the transverse dimension of said broad walls.

MILTON G. WHITE.

REFERENCES CITED

The following references are of record in the file of this patent:

UNITED STATES PATENTS

| Number | Name | Date |
| --- | --- | --- |
| 2,338,441 | Kohl | Jan. 4, 1944 |
| 2,395,560 | Llewellyn | Feb. 26, 1946 |
| 2,405,437 | Leeds | Aug. 6, 1946 |
| 2,438,913 | Hansen | Apr. 6, 1948 |
| 2,460,109 | Southworth | Jan. 25, 1949 |

FOREIGN PATENTS

| Number | Country | Date |
| --- | --- | --- |
| 116,110 | Australia | Nov. 19, 1942 |
| 877,692 | France | Dec. 14, 1942 |